US011673322B2

(12) United States Patent
Azarov et al.

(10) Patent No.: US 11,673,322 B2
(45) Date of Patent: Jun. 13, 2023

(54) PRODUCTION OF ARTICLES MADE OF COMPOSITE MATERIALS BY 3D-PRINTING METHOD

(71) Applicant: ANISOPRINT SOCIÉTÉÀ RESPONSABILITÉ LIMITÉE (S.A.R.L.) [LU/LU], Esch-sur-Alzette (LU)

(72) Inventors: Andrey Valerievich Azarov, Moscow (RU); Fedor Konstantinovich Antonov, Moscow (RU); Mikhail Valerievich Golubev, Moscow (RU); Aleksey Ravkatovich Khaziev, Moscow (RU)

(73) Assignee: ANISOPRINT SOCIÉTÉÀ RESPONSABILITÉ LIMITÉE (S.A.R.L.) [LU/LU], Esch-sur-Alzette (LU)

( * ) Notice: Subject to any disclaimer, the term of this patent is extended or adjusted under 35 U.S.C. 154(b) by 100 days.

(21) Appl. No.: 16/652,686

(22) PCT Filed: Dec. 20, 2017

(86) PCT No.: PCT/RU2017/000955
§ 371 (c)(1),
(2) Date: Apr. 1, 2020

(87) PCT Pub. No.: WO2019/070150
PCT Pub. Date: Apr. 11, 2019

(65) Prior Publication Data
US 2020/0230878 A1    Jul. 23, 2020

(30) Foreign Application Priority Data
Oct. 3, 2017  (RU) ............................ RU2017134426

(51) Int. Cl.
*B29C 64/165* (2017.01)
*B29C 64/188* (2017.01)
(Continued)

(52) U.S. Cl.
CPC .......... *B29C 64/165* (2017.08); *B29C 64/188* (2017.08); *B29C 64/209* (2017.08);
(Continued)

(58) Field of Classification Search
CPC ........................... B29C 64/118; B29C 64/165
See application file for complete search history.

(56) References Cited

U.S. PATENT DOCUMENTS

| 6,077,580 A | 6/2000 | Vasiliev |
| 2014/0134335 A1 | 5/2014 | Pridoehl et al. |

(Continued)

FOREIGN PATENT DOCUMENTS

| CN | 105367998 A | 3/2016 |
| RU | 2107622 | 3/1998 |

*Primary Examiner* — Timothy Kennedy
(74) *Attorney, Agent, or Firm* — Nixon & Vanderhye PC

(57) ABSTRACT

The invention relates to the field of additive technologies and can be used for manufacturing components and structures made of composite materials. A device comprises an extruder having inlet channels, a heater, a camera, a temperature sensor, a nozzle for material discharge, mechanisms for feeding material and composite fiber in the form of thread, a thread-cutting mechanism, a table and a three-dimensional displacement mechanism. A method comprises manufacturing composite fiber, feeding the fiber and thermoplastic material into the extruder, and heating up the extruder, wherein the thermoplastic material is combined with the composite fiber. The composite material is then extruded onto the surface of the table, where the composite fiber cools and hardens, and the melt of thermoplastic material solidifies, bonding the composite fibers to one another and forming the article. In addition, in the process of (Continued)

forming the article, the composite fiber is cut and the extruder moves on to the next section of the trajectory thereof.

18 Claims, 7 Drawing Sheets

(51) Int. Cl.
    *B29C 64/232*     (2017.01)
    *B29C 64/295*     (2017.01)
    *B29C 64/209*     (2017.01)
    *B29C 64/236*     (2017.01)
    *B29C 64/218*     (2017.01)
    *B29C 64/336*     (2017.01)
    *B33Y 10/00*     (2015.01)
    *B33Y 30/00*     (2015.01)
    *B33Y 40/20*     (2020.01)

(52) U.S. Cl.
    CPC .......... *B29C 64/218* (2017.08); *B29C 64/232* (2017.08); *B29C 64/236* (2017.08); *B29C 64/295* (2017.08); *B29C 64/336* (2017.08); *B33Y 10/00* (2014.12); *B33Y 30/00* (2014.12); *B33Y 40/20* (2020.01)

(56) References Cited

U.S. PATENT DOCUMENTS

| | | | |
|---|---|---|---|
| 2014/0291886 A1 | 10/2014 | Mark et al. | |
| 2014/0328963 A1 | 11/2014 | Mark et al. | |
| 2014/0328964 A1 | 11/2014 | Mark et al. | |
| 2014/0361460 A1 | 12/2014 | Mark | |
| 2015/0108677 A1 | 4/2015 | Mark et al. | |
| 2015/0165691 A1 | 6/2015 | Mark et al. | |
| 2016/0067928 A1 | 3/2016 | Mark et al. | |
| 2017/0151728 A1* | 6/2017 | Kune | B29C 64/118 |
| 2017/0157831 A1* | 6/2017 | Mandel | B29C 64/118 |

* cited by examiner

PRODUCTION OF ARTICLES MADE OF COMPOSITE MATERIALS BY 3D-PRINTING METHOD

This application is the U.S. national phase of International Application No. PCT/RU2017/000955 filed Dec. 20, 2017 which claims priority to RU 2017134426 filed Oct. 3, 2017, the entire contents of each of which are hereby incorporated by reference.

FIELD OF THE INVENTION

The invention relates to the field of additive technologies and can be used for the manufacture of parts and structures made of composite materials, such as brackets, fittings, basic parts, wearable products, mesh and honeycomb structures for use in aviation, rocket and space technology, medicine, automotive industry, etc.

BACKGROUND

Known in the art are 3-D printing methods and equipment using composite fibers. The closest analogues are described in the Mark Forged applications (USA):

[1] Application US20140291886—Three dimensional printing, IPC B29C47/00, Published 2 Oct. 2014;

[2] Application US20140328963—Apparatus for fiber reinforced additive manufacturing, IPC B29C67/00, Published 6 Nov. 2014;

[3] Application US20140328964—Three dimensional printing, IPC B29C67/00, Published 6 Nov. 2014;

[4] Application US20140361460—Methods for fiber reinforced additive manufacturing, IPC B29C65/40, B29C67/00, Published 11 Dec. 2014;

[5] Application US20150108677—Three dimensional printer with composite filament fabrication, IPC B29C67/00, Published 23 Apr. 2015;

[6] Application US20150165691—Methods for fiber reinforced additive manufacturing, IPC B29C67/00, Published 18 Jun. 2015;

The applications describe a method of 3D printing using a composite fiber consisting of a core (filler) and a plastic coating (matrix). The composite fiber includes continuous or semi-continuous fibers as a filler, such as reinforcing fibers, optical fiber, conductive filaments, etc. The matrix is a thermoplastic material. When printing, the fiber is heated to a temperature that is higher than the melting temperature of the matrix material. The described printing method is implemented in a three-dimensional printer containing an extruder of a special design, into which the above-mentioned composite fiber is fed.

A composite fiber is produced by special equipment into which a continuous fiber and matrix material are fed and their joint extrusion occurs. To improve the impregnation process, the fiber can be pre-vacuumized (to eliminate air and moisture) and pass through the rollers making a flat bundle of fibers to provide better treatment or producing the pressure that helps to introduce the matrix material into a bundle of fibers, and this fiber can be subjected to a surface-activating substances, steam, ozone, etc. to improve the link of the fiber with the matrix.

The disadvantage of the described solution is the difficulty of providing a quality impregnation of the fiber bundle with thermoplastics, which is due to the extremely high viscosity of their melts. The resulting material may have high porosity and the fibers will not work together. In order to realize high-quality impregnation, it is necessary to expose the material to high pressure (up to 50 atmospheres); but in this case, the fibers may be damaged and the internal structure of the material may be uneven. In addition, the proposed method involves the feeding of the extruder with a pre-impregnated composite fiber providing for a predetermined ratio of the volume fractions of the fibers and the matrix, which does not allow for varying the volume fraction of the fibers in the printing process.

In order to avoid the difficulties associated with the impregnation of a fiber bundle with thermoplastics, a two-matrix material can be used in which the fiber bundles are impregnated with a low viscosity thermosetting binder and are interconnected by thermoplastics. Such material is described in the following patents:

[7] RU 2107622—Method of manufacturing a high-strength pipe shells made of composite materials (options), Published 27 Mar. 1998.

[8] U.S. Ser. No. 00/607,7580—Composite shell shaped as a body of revolution and a method of forming the same, Published 20 Jun. 2000.

However, the method of forming the material described in the patents is only applicable for the manufacture of rotational bodies, such as pipelines and pressure cylinders, by winding.

SUMMARY OF THE INVENTION

The technical problem to be solved by the invention is the three-dimensional printing manufacture of functional parts from composite materials of complex shape and internal structure, which have high physical and mechanical characteristics; the manufacture of parts with improved specific strength characteristics of the material in relation to the density, which exceed the characteristics of aluminum alloys (AMg6, D16, etc.) usually used in aircraft and rocket and space technology. To achieve these characteristics, the qualitative impregnation of the reinforcement fiber bundle with a matrix is provided with elimination of pores and voids.

The technical result of the invention consists in improving the specific strength characteristics of the material, the physical and mechanical characteristics, in reducing the porosity and in providing a uniform internal structure when varying the volume fraction of the fibers and the matrix in the printing process.

The technical result is achieved due to the claimed method for manufacturing products from a composite material reinforced with continuous fibers by three-dimensional printing, comprising:

obtaining a composite fiber, wherein a fiber bundle is impregnated with a thermosetting binder with a volume fraction of 15-60% and subjected to temperature treatment until the binder is cured;

feeding the composite fiber in a filamentous form and a thermoplastic material into an extruder;

heating the extruder to a temperature exceeding melting point of the thermoplastic material and glass transition temperature of the thermosetting binder, while the thermoplastic material is combined with the composite fiber;

moving the extruder along a programmed trajectory and extruding the composite material obtained by combining the thermoplastic material with the composite fiber through a nozzle onto a table surface, where the composite fiber becomes rigid upon cooling, and a melt of the thermoplastic material solidifies linking composite fibers together and forming a product;

in the process of forming the product, executing a cut of the composite fiber by a trimming mechanism, and moving the extruder without extrusion of composite material to a next section of the programmed trajectory; then resuming extrusion of composite material.

Also, the technical result is achieved by using reinforcing and / or functional fibers as fibers. The reinforcing fibers are carbon and/or glass and/or aramid and/or basalt and/or boron and/or metal fibers. Optical and/or conductive fibers are used as functional fibers. A thermosetting binder used is a thermosetting plastic based on phenol formaldehyde, polyester, epoxy, urea, epoxy phenolic, silicone, polyimide, bismaleimide binders. The thermoplastic material is fed in the form of a filament or granules or powder. Thermoplastic materials used include acrylonitrile butadiene styrene, polylactide, polyamide, polyetherimide, polyethylene terephthalate, polyacetal, polysulfone, polyetheretherketone, polyethylene terephthalate glycol. The movement of the extruder is provided by means of at least three coordinate movement mechanism, which allows for moving it relative to the surface of the table along the programmed trajectory. The movement of the extruder along the programmed trajectory is synchronized with the supply of the composite fiber and thermoplastic material by means of a control system, which additionally maintains the pre-assigned temperature of the extruder and the table and the switch-on of the trimming mechanism at the pre-assigned times. In the course of manufacture, the composite fiber is additionally coated with a layer of thermoplastic material.

Also, the technical result is achieved because a thermoplastic material is additionally fed in an additional second extruder and heated to a temperature above the melting point of the thermoplastic material, and an alternate extrusion of the composite material from the extruder and the thermoplastic material from the additional second extruder onto the surface of the table, and while in the process the composite material is cut away if a temporary cessation of extrusion from the extruder is required.

Also, the technical result is achieved because a thermoplastic material is additionally fed in an additional second extruder and heated to a temperature above the melting point of the thermoplastic material; and also an additional thermoplastic material, which is able to dissolve in substances in which the thermoplastic material and thermosetting binder of the composite fiber are not dissolved, is fed into an additional third extruder, which is heated to a temperature exceeding the melting temperature of the additional thermoplastic material; and then an alternate extrusion of the composite material is performed from the extruder and the thermoplastic material from the additional second extruder and the additional thermoplastic material from the additional third extruder is carried out in turn onto the surface of the table, and while in the process the composite material is cut away if a temporary cessation of extrusion from the extruder is required.

The movement of the extruder and additional second and third extruders is carried out by means of at least three coordinate movement mechanism, which allows them to move relative to the surface of the table along the programmed trajectory.

The technical result is also achieved by the claimed machine for manufacturing products from a composite material reinforced with continuous fibers by the abovementioned method, the machine comprising:

an extruder with input channels for a composite fiber in a filamentous form and a thermoplastic material, while containing a heater, a chamber, a temperature sensor and a nozzle for output of the composite material;

feeding mechanisms for the thermoplastic material and the composite fiber;

a trimming mechanism for a reinforcing filament;

a table with a surface;

at least three-coordinate movement mechanism allowing the extruder to be moved relative to the table surface along a programmed trajectory.

In addition, the technical result is achieved because the mechanism to feed the composite fiber in the form of a filament is made in the form of rollers. When feeding the thermoplastic material in the form of a filament, the feed mechanism of thermoplastic material is made in the form of rollers, and when feeding the thermoplastic material in the form of granules or powder, the feed mechanism of thermoplastic material is made in the form of an auger. The machine additionally contains the second extruder with an input channel for a thermoplastic material, while including a heater, a chamber, a temperature sensor and a nozzle for the output of a thermoplastic material, and also includes an additional third extruder with an input channel for an additional thermoplastic material, while containing a heater, a chamber, a temperature sensor and a nozzle for the output of an additional thermoplastic material that is capable of dissolving in substances in which the thermoplastic material and the thermosetting binder of a composite fiber do not dissolve. The machine additionally contains at least a three-coordinate movement mechanism that allows for moving the extruder, additional second and third extruders relative to the table surface along the programmed trajectory.

The created method of three-dimensional printing is based on the use of a composite fiber, which is a bundle of fibers impregnated with a binder and cured. It is essential that the material which is impregnated is a thermoset in contrast to the previously mentioned analogue. Thermosets have good technological properties, in particular, low viscosity and good adhesion to all currently used types of reinforcing fibers, which allows to provide high-quality impregnation of the reinforcing fiber bundle with the matrix while eliminating pores and voids and, consequently, the joint operation of the fiber and the matrix. At the same time, the high-quality impregnation will not require the application of pressure, the presence of rollers deforming the bundle, the channels of a curved shape, the pre-activation of the fiber surface and other actions that are used to solve this problem in the previously mentioned analogue.

BRIEF DESCRIPTION OF THE DRAWINGS

Details, features, and advantages of the present invention are presented in the following description of the alternative embodiments of the claimed invention with the use of the drawings, as follows:

The following positions on the figures are indicated by numbers:

1—matrix material;
2—reinforcing fiber;
3—functional fiber;
4—composite fiber (bundle of fibers impregnated with a matrix material);
5—thermoplastic material (thermoplastics)
6—composite fiber with thermoplastic coating (composite fiber (fiber bundle impregnated with matrix material) and coated with thermoplastics);
7—reinforcing filament (composite fiber or composite fiber with a thermoplastic coating);
8—bobbin with a reinforcing filament;
9—extruder;
10—filament of thermoplastic material (thermoplastic filament);
11—bobbin with thermoplastic filament;
12—reinforcing filament feed mechanism;
13—feed mechanism of thermoplastics;
15—reinforcing filament feed tube;
16—thermoplastic filament feed tube;
17—heater;
18—temperature sensor;
19—chamber of extruder (chamber for melt, in which the reinforcement filament and thermoplastic are combined);
20—nozzle;
21—table (work surface);
22—layer of composite material;
23—composite material (reinforced thermoplastics coming out of the extruder nozzle);
24—reinforcing filament trimming mechanism;
26—fillet at the nozzle outlet;
27—lateral spherical surface of the nozzle;
28—nozzle ledge;
29—product example;
30—section with a small pitch of composite fibers (large volume content of composite fibers);
31—section with a large pitch of composite fibers (small volume content of composite fibers);
32—hole in the part;
33—hole reinforcing rows of composite fibers;
φ—angle of laying of composite fibers;
34—longitudinal rib;
35—transverse rib;
36—rib crossing zone;
37—additional second extruder to print with a pure thermoplastic or with a thermoplastic reinforced with discrete fibers;
38—additional third extruder to print support structures;
39—filament of thermoplastic material for printing supporting structures (additional thermoplastic material);
40—product of sophisticated shape;
41—layer of thermoplastic material;
42—supporting structure.

DETAILED DESCRIPTION OF THE INVENTION

Figure 1A:
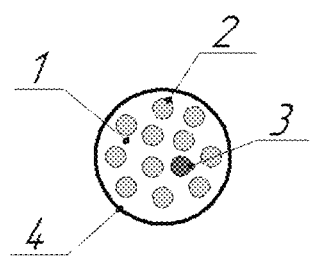
FIG. 1—cross section of a composite fiber (FIG. 1A—composite fiber, FIG. 1B—composite fiber with a thermoplastic coating)

The created method of three-dimensional printing is based on the use of composite fiber (FIG. 1A). Composite fiber 4 is a bundle of fibers impregnated with matrix material 1 and hardened. The bundle can contain continuous reinforcing fibers 2, such as carbon, glass, aramid, basalt, boron, metal fibers, as well as functional fibers 3, such as optical and/or conductive fibers, such as copper ones. The bundle may include a different number of fibers, for example, 2, 100, 1000, 3000, 6000 and so on. Matrix material 1 used for impregnation is a thermosetting plastic (thermoset) based on phenol-formaldehyde, polyester, epoxy, silicone, polyimide, bismaleimide and other binding materials, or a mixture of a thermosetting binder with a thermoplastic binder. Thermosets possess good processing properties, in particular, low viscosity and good adhesion to any currently used types of reinforcing fibers that allow for a good impregnation of the reinforcing fiber bundle with the matrix in the absence of pores and voids and, therefore, a joint action of the fiber and the matrix. For the production of a reinforcing composite filament, the bundle is impregnated with a binder so that the volume fraction of the binder is 15-60%. Thus, the ratio of the volume fractions of fibers and matrix material can be in the range of 85%:15% to 40%:60%. For example, the volume fractions of fibers and matrix material may have a ratio of 60%:40%, 70%:30%, 80%:20% or otherwise. The bundle is then subjected to heat treatment until the matrix material is completely cured. The temperature regime and the duration of curing depend on a particular type and grade of the matrix material.

Figure 1B:
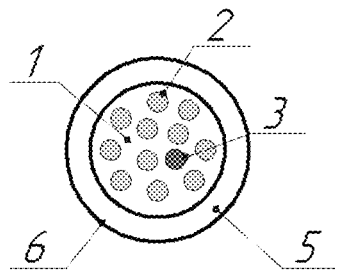

An alternate embodiment is possible when, after curing composite fiber 4 is covered by thermoplastic material 5 (thermoplastic), such as acrylonitrile butadiene styrene (ABS), polylactide (PLA), polyamide (PA), polyetherimide (PEI), polyethylene terephthalate (PET), polyacetal, polysulfone, polyetheretherketone (PEEK), polyethylene terephthalate glycol, or other thermoplastic. For this purpose, cured composite fiber 4 passes through the chamber filled with molten thermoplastic 5 and goes out through the spinneret, which provides the prescribed diameter and shape of composite fiber with thermoplastic coating 6 (FIG. 1B).

Figure 2:
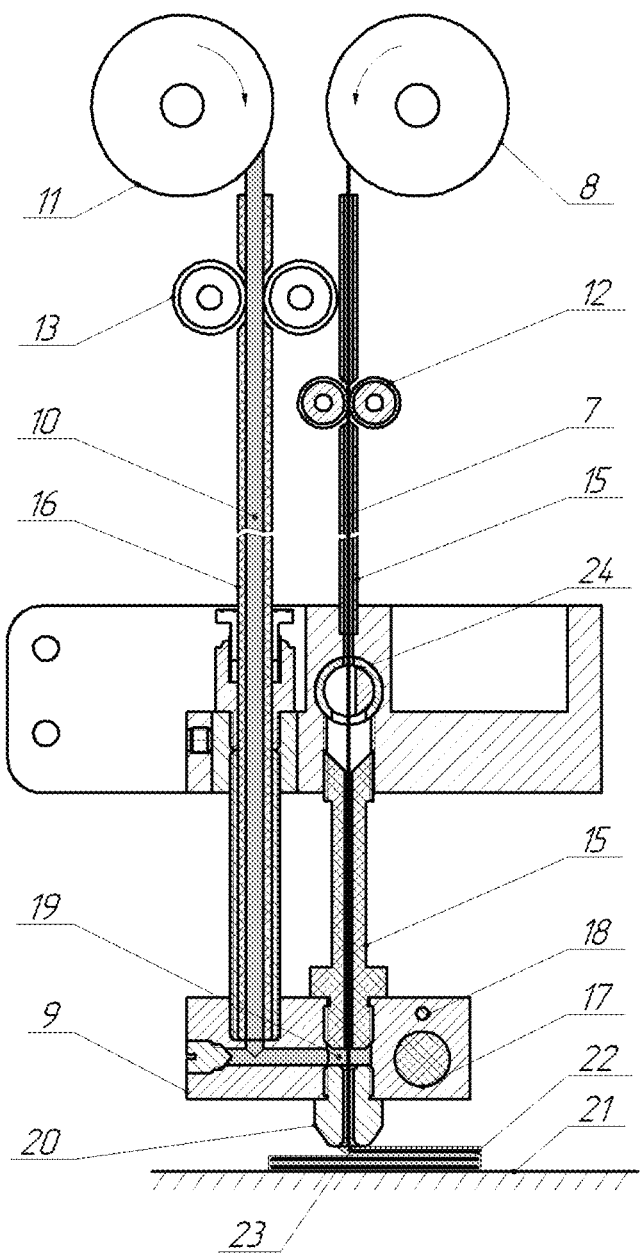
FIG. 2—a schematic of a machine for three-dimensional printing of products from fiber reinforced composite materials.

The manufacture of a product (a part) is carried out by means of the machine shown in FIG. 2. When printing, extruder 9 is used receiving reinforcing filament 7 (i.e. a composite fiber in the form of a filament), that is composite fiber 4 or composite fiber with a thermoplastic coating 6 (FIG. 1A or FIG. 1B), and thermoplastic material 5, such as ABS, PLA, PA, PEI, polyacetal, PET, polysulfone, PEEK or other thermoplastic. FIG. 2 shows thermoplastic material 5 supplied in the form of thermoplastics filament 10, however, this embodiment of the claimed invention is not limited to the use of a thermoplastics filament, i.e. an embodiment is also possible when thermoplastics is fed, in the form of granules or powder in the extruder instead of a thermoplastics in the form of a filament. Reinforcing filament 7 is moved from bobbin 8 by reinforcing filament feed mechanism 12 made in the form of rollers, which, when rotating, advance the filament, and the tension of the reinforcing filament is controlled. The feed of thermoplastic material 5 in the form of thermoplastic filament 10 is carried out from bobbin 11 by thermoplastic feed mechanism 1, made in the form of rollers, the rotation of which is used to advance the filament. When using thermoplastic material 5 in the form of granules or powder, the feed is carried out from the hopper by thermoplastic feed mechanism made in the form of an auger.

Feed mechanisms 12 and 13 may be located at different distances from the extruder, for example, 1 mm, 10 mm, 50 mm, 100 mm, 300 mm and so on. If the feeders are located at a distance from the extruder, the feed of thermoplastic material 5 (i.e. filament 10 or granules or powder of thermoplastics) to extruder 9 can be carried out through feed tube 16, and the reinforcing filament—through feed tube 15.

Extruder 9 is heated by heater 17 to a temperature exceeding the melting temperature of thermoplastics 10 and the glass transition temperature of thermosetting matrix material 1 of reinforcing filament 7; the temperature should not exceed the destruction temperature of matrix material 1 of reinforcing filament 7. Heater 17 can be of different type, such as cartridge, clamp, flat and other type. The temperature is controlled by sensor 18, for example, a thermocouple or a thermistor. At this temperature, thermoplastic filament 10 is melted and fills extruder chamber 19, which is connected with reinforcing filament 7. If reinforcing filament 7 is a composite fiber with thermoplastic coating 6 (FIG. 1B), the thermoplastic cover (thermoplastic 5) of composite fiber is also melted. Thus, composite material 23 (composite fiber 4 surrounded by a melt of thermoplastics) leaves the extruder chamber. The rollers of feed mechanism 13 rotate and move thermoplastic filament 10 with pushing it into extruder chamber 19 through the input channel to feed the thermoplastics. In this case, when an auger is used as a feeding mechanism, the auger also rotates and moves (pushes) the thermoplastics in the form of granules or powder extruder chamber 19. The rollers of feed mechanism 12 rotate and move reinforcing filament 7 into extruder chamber 19 through the input channel for feeding the reinforcing filament. The thermoplastic melt pressure is created In chamber 19 and the composite fiber together with the thermoplastics is extruded through nozzle 20 onto the surface of the table 21 (working surface) in the form of composite material 23 (reinforced thermoplastics). Simultaneously with the operation of feeding mechanisms 12 and 13, the extruder moves relative to table 21 in accordance with the shape of the product. To move the extruder relative to the table, the extruder and the table can be installed on at least a 3-coordinate movement mechanism, preferably on a six-coordinate mechanism (so-called positioning system). Under the influence of heating, matrix material 1 of composite fiber 4 softens, which enable it to bend and fit on table 21 with repeating the trajectory of the extruder. On leaving the extruder, the thermoplastic melt solidifies, and composite fiber 4 is cooled and again becomes rigid with forming composite material layer 22, which has high mechanical characteristics. In this case, after cooling, composite fiber 4 is attached to the surface of table 21 or the previous layers of the product with the help of a thermoplastic layer. Table 21 can be heated for more secure attachment of a composite fiber with a thermoplastic layer.

Thus, by reducing the feed rate of reinforcing filament 7 with the use of the rollers of feed mechanism 12 as compared to the speed of extruder 9 relative to table 21, it is possible to produce a tension of the reinforcing filament for the straightening of fibers 2 and/or 3 and the improvement of the mechanical characteristics of the material. On the contrary, by increasing the feed rate of reinforcing filament 7, we can reduce the tension of the reinforcing filament to prevent it from slipping if its trajectory has a large curvature.

It is essential that matrix material 1 of composite fiber 4 is not melted, but only softened, and fibers 2 and/or 3 of the reinforcing bundle, which are located inside composite fiber 4, retain their position.

If the extruder is fed not with a thermoplastic filament, but with the thermoplastics in the form of granules or powder, the feed mechanism contains an auger instead of feed rollers, and this auger captures granules or powder from the hopper and feeds them into the heated extruder. The pressure in chamber 19 is generated by pushing a thermoplastic filament by rollers or by pushing granules or powder with an auger.

The machine includes trimming mechanism 24, which is designed to cut reinforcing filament 7 when moving between the sections of the product, between layers of composite material 22, and on finishing the printing of the product. Trimming mechanism 24 can be located either between feed mechanism 12 and extruder 9, or at the output of nozzle 20. In the latter case, composite material 23 is cut, i.e. the trimming of composite fiber 4 surrounded by the melt of thermoplastic 5. While in the process, the moving parts of trimming mechanism 24, for example, knives, should be above or away from nozzle 20, so as not to interfere with the printing process. When cutting, extruder 9 rises and the trimming mechanism is set in motion and cuts off composite material 22 between the edge of nozzle 20 cut and the product.

The machine comprises the control system providing a simultaneous programmed movement of the travel mechanism of extruder 9 with respect to table 21 and feed mechanisms 12 and 13, the maintenance of the predetermined temperature of extruder 9 and table 21, and the action of trimming mechanism 24 at specified moments.

One of the main features of the proposed method is the ability to control the volume ratio of composite fibers 4 and thermoplastics in the process of printing. This is provided by adjusting the feeding rate of thermoplastic filament 10 into extruder 9 shown in FIG. 2 by feed mechanism 13 and the feed rate of reinforced filament 7 by feed mechanism 12. Thus, it is possible to vary the pressure of thermoplastics in chamber 19 of the extruder and, accordingly, the quantity of plastic in composite material 23 coming out from nozzle 20. The rotational speed of the rollers of feed mechanisms 12 and 13 is regulated by the control system so that the volume fraction of thermoplastics in the extruded material (composite material 23) is 20-70%. In this case, the volume ratio of composite fibers 4 in resulting composite material 23 can be 30-80%, which corresponds to the volume ratio of fibers 2 and/or 3 from 12 to 68% in composite material 23. Thus, it is possible to manufacture parts in which the volume ratio of composite fibers 4 will be different in different portions of the product. If the extruder is supplied not with a thermoplastic filament, but with thermoplastics in the form of granules or powder, the volume ratio of thermoplastics is controlled by adjusting the rotational speed of the feed auger. Also, when changing their rotational speed with respect to the movement speed of the extruder, the rollers of feed mechanism 12 advancing reinforcing filament 7, control the tension of reinforcing filament 7 and, accordingly, composite fiber 4 in composite material 23 laid out on table 21. The rollers can slow down on the straight sections of the trajectory with increasing the tension of reinforcing filament 7, and accelerate on the curved sections with reducing its tension to avoid a sliding of reinforcing filament 7 from the printing trajectory.

Figure 3A:
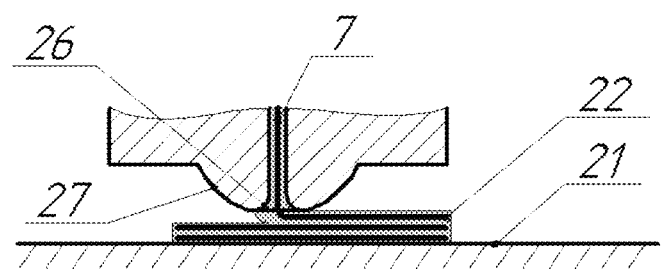
FIG. 3—a schematic of extruder nozzle (FIG. 3A—nozzle of spherical or conical shape, FIG. 3B—nozzle with ledge)
Figure 3B:
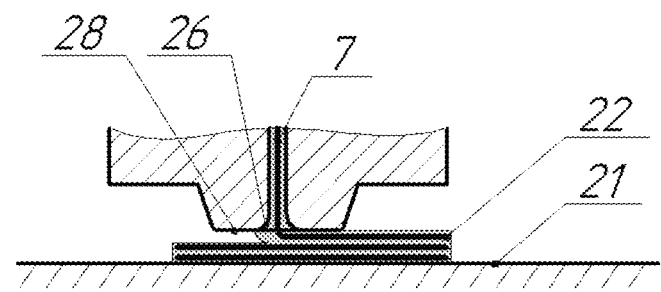

In order to maximize the characteristics of resulting composite material 23, nozzles are used with a special shape, as shown in FIG. 3. Because matrix material 1 of composite fiber 4 does not melt, but only softens, composite fiber 4 is not able to undergo sharp bends that lead to its fracture, so, in order to avoid a sharp bend and damage to composite fiber 4 at the outlet of the nozzle, the channel must have a fillet or rounding. To reduce the porosity and compaction of the fiber laying in the resulting product, the nozzle can have a smooth spherical shape, as shown in FIG. 3A. In this case, the lateral surface of nozzle 27 has the shape of a sphere, and a toroidal surface is formed at the nozzle face; this surface, when in printing, slides along the surface of the laid-out composite material with applying a contact pressure to the material, as in the case of the rollers of the laying-out machines. If high-temperature thermoplastics, such as PEEK, are used for printing, in order to ensure a good fusion of the layers of composite material 22 among themselves, it is necessary to warm the material near the place of laying out a new layer. For this purpose the nozzle shown in FIG. 3B can be used which has ledge 28 around the nozzle outlet. The heated ledge provides heating of reinforced thermoplastics around the nozzle outlet to ensure a better fusion of laid-out layer 22 to the previous layer.

Figure 4A:
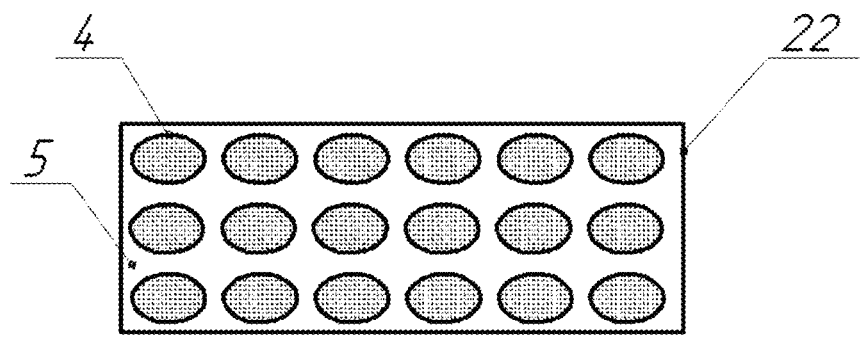
FIG. 4—cross section of multilayer composite material produced by 3D printing (FIG. 4A—composite material with a rectangular laying, FIG. 4B—composite material with a hexagonal laying)
Figure 4B:
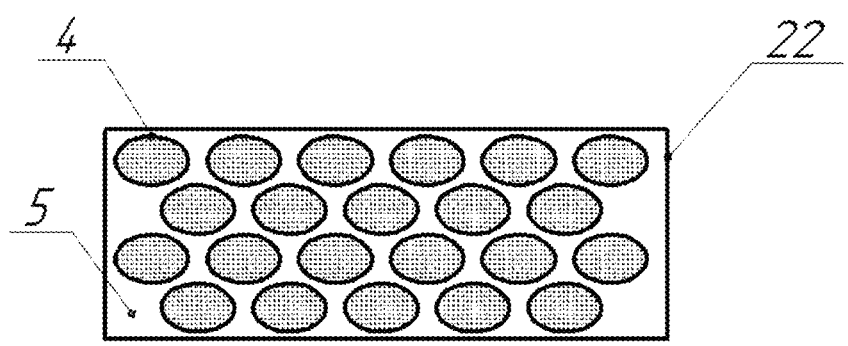

Due to the fact that, when printing, composite material (reinforced thermoplastic) 23 is formed by laying out one composite fiber 0.2-1.0 mm in diameter, this method, in contrast to the known methods of winding and layout, allows more flexibility to control the internal structure of a composite material, namely, the location of composite fibers 4, by laying them, for example, rectangular, as shown in FIG. 4 A, that is, by placing composite fibers 4 in thermoplastic matrix 5 one above the other, or hexagonal, as shown in FIG. 4B, that is, by placing composite fibers 4 in matrix 5 with an offset, which makes it possible to increase the volume ratio of composite fibers and, accordingly, to improve the mechanical characteristics of the product.

Figure 5:
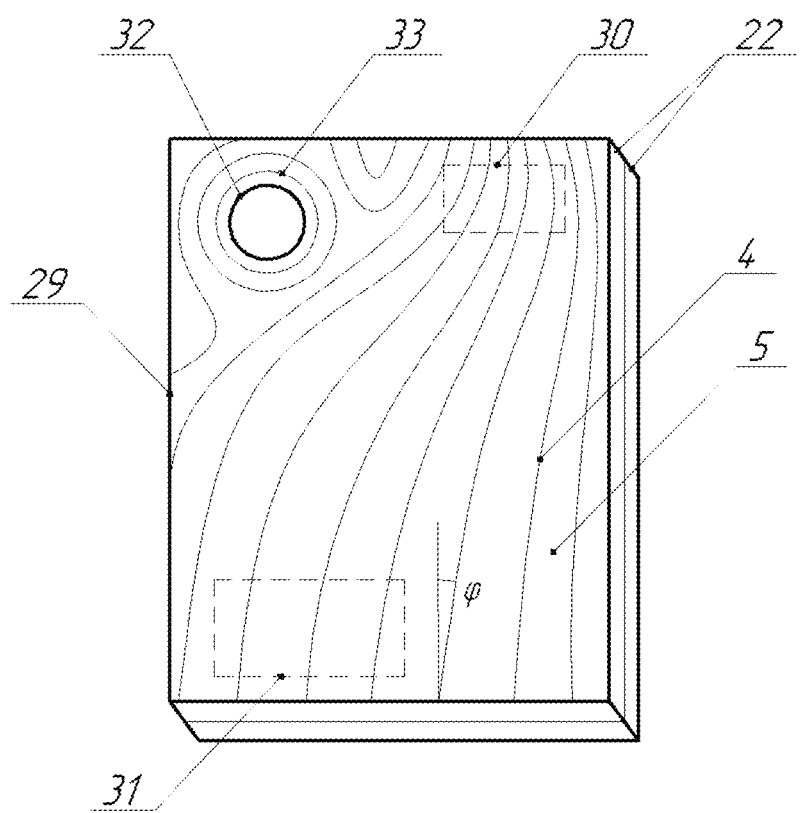
FIG. 5—a fragment of a multilayer composite part made by 3D printing.

It is also possible to control flexibly the laying path of composite fibers 4 in the layer. FIG. 5 shows a fragment of the composite product, which can be made in the considered way. The laying angle φ of composite fiber 4 may be different in different portions of product 29. In addition, by changing the feed rate of reinforcing filament 7 and thermoplastic 10 (or thermoplastics in the form of granules or powder) in extruder 9, as well as the distance between composite fibers 4 when they are laid out, it is possible to change the volume ratio of composite fibers 4 and thermoplastic 5 in the resulting composite material and create products, in which sections 30 with a high fiber content and sections 31 with a lower fiber content are to be present. This feature provides flexible control of the structure of the material and its optimization in order to obtain more durable and lightweight products. In addition, the method considered allows to strengthen the weaknesses of the product, such as holes 32 by edging them along the contour with one or more rows of composite fibers 33.

Figure 6:
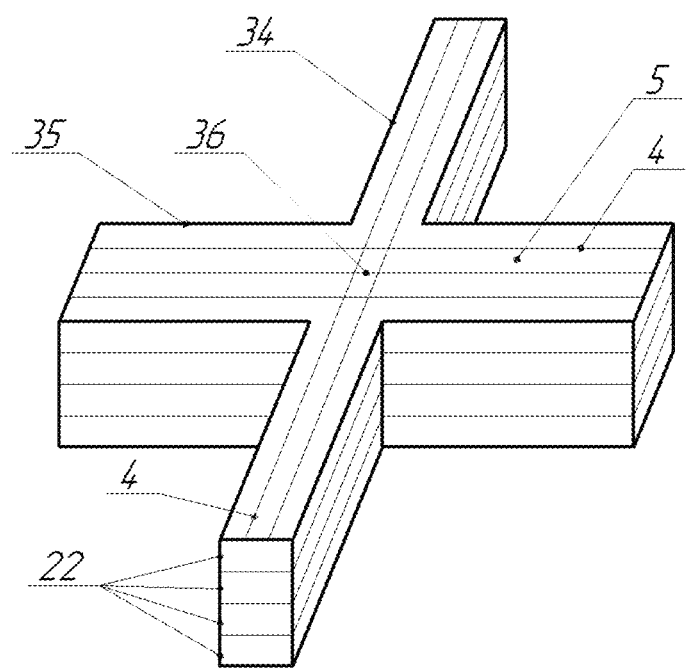
FIG. 6—a fragment of a lattice composite part made by 3D printing.

The above-described possibility of controlling the volume fraction of composite fibers 4 in the composite material allows to produce ribbed reinforced or cellular composite structures. A fragment of such a structure is shown in FIG. 6. As an example, FIG. 6 shows the structure consisting of intersecting longitudinal ribs 34 and transverse ribs 35, but real structures of this type can contain any number of ribs directed along different trajectories, both rectilinear and curvilinear. The ribs consist of composite material layers 22 and contain composite fibers 4. To implement this design, it is necessary that the volume ratio of composite fibers 4 in composite material layer 22 will be different at rib intersection zone 36 and at the portions of the ribs between the intersection zones and the volume content of composite fibers 4 in the rib material between the intersections will be less than 50%, preferably 40%. Otherwise, the thickness of the material in intersection zone 36 will be greater than in ribs 34 and 35, and a bending of fibers appears in intersection zone 36, which will reduce the strength of the structure. This design can be implemented in the considered way. For this purpose, when the extruder passes the rib section between the intersections, the feed rate of plastic filament 10 to extruder 9 should be set so that the volume content of composite fibers 4 in the composite material being formed is less than 50% (preferably 40%), and that in thermoplastics 5—more than 50% (preferably 60%); and when the extruder passes intersection zone 36, the feed rate of plastic filament 10 decreases sharply, thereafter the movement stops or begins in the opposite direction to reduce sharply the pressure of the plastic in extruder chamber 19, which leads to a decrease in the volume fraction of thermoplastic 5 in intersection zone 36 to a value of 0 to 20% (preferably—20%). If the ribs have a small thickness (up to 3 mm), the change in the feed rate of plastic filament 10, when passing intersection zone 36, is not necessary, since the surplus of thermoplastic 5 can be forced out of intersection zone 36, when printing.

Figure 7:
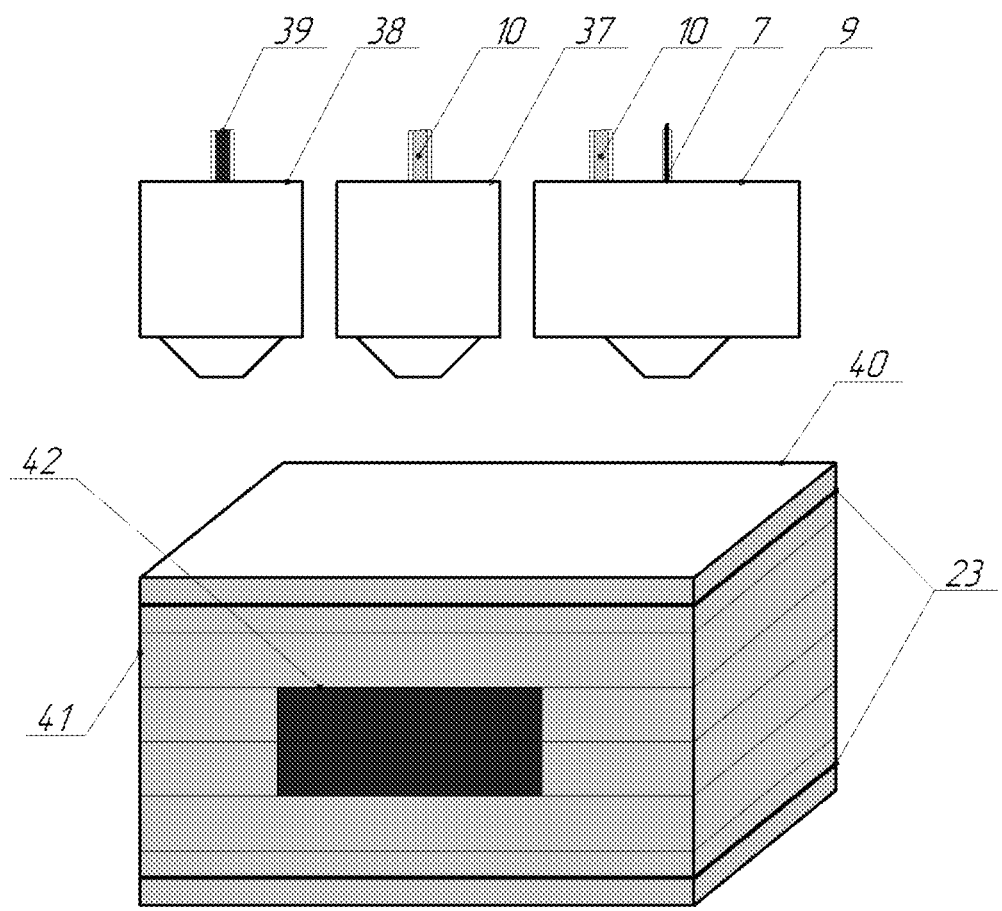
FIG. 7—printing of products with complicated structure.

For the manufacture of products of sophisticated shape, the machine implementing this method of printing shall contain at least one extruder 9 described above and intended for printing with a composite material, for which plastic filament 10 (or thermoplastics in the form of granules or powder) and reinforcing filament 7 is fed into the extruder. To expand the capabilities of the machine for the manufacture of complex products, the machine can contain additional second extruder 37 and/or additional third extruder 38, which are renowned extruders for plastic printing. Additional second extruder 37 is designed for printing with pure plastic, for which plastic filament 10 (thermoplastic material) is fed into the extruder identical to that fed into first extruder 9 (either thermoplastics in the form of granules or powder identical to that fed into in the first extruder). An additional third extruder 38 is designed to print supporting structures 42; for this purpose the extruder is supplied with additional thermoplastic material 39 (in the form of a plastic thread, or in the form of powder or granules) to print supporting structures 42, which, on finishing the manufacture of the product, can be removed in a way that does not damage the rest of the product (namely, non-damaging thermoplastic material and thermosetting binder of composite fiber), for example, chemically, and thus, which is intended for making temporary supporting structures. Thus, products 40 (FIG. 7) can be produced which consist partially of composite material 23, partially of pure plastic 41, and partly of support material 42 that is subsequently removed. In this case, the manufacture of a product does not require technological tooling, as with known methods of winding and laying out. In addition to feeding a filament (either powder or granules) of pure plastic 10, extruders 9 and 37 can be fed with a thermoplastic filament containing various inclusions, for example, chopped reinforcing fibers (carbon, glass, etc.), or various particles. Such inclusions serve to further improve the mechanical characteristics of the product, increase its hardness, thermal conductivity, and to reduce the coefficient of thermal expansion or for other purposes.

The invention claimed is:
1. A method for manufacturing a product from a composite material reinforced with continuous fibers by three-dimensional printing, the method comprising:
  feeding a composite fiber in a filamentous form and a thermoplastic material into an extruder, the composite fiber comprising a fiber bundle impregnated with a thermosetting binder with a volume fraction of 15-60% and subjected to temperature treatment until the binder is completely cured;
  heating the extruder to a temperature exceeding melting point of the thermoplastic material and glass transition temperature of the thermosetting binder, while the thermoplastic material is combined with the composite fiber;

moving the extruder along a programmed trajectory and extruding the composite material obtained by combining the thermoplastic material with the composite fiber through a nozzle onto a table surface, where the composite fiber becomes rigid upon cooling, and a melt of the thermoplastic material solidifies linking composite fibers together and forming the product; and in the process of forming the product, executing a cut of the composite fiber by a trimming mechanism, and moving the extruder without extrusion of the composite material to a next section of the programmed trajectory; then resuming extrusion of the composite material, wherein the composite fibers are laid to produce a ribbed or cellular composite structure for the product, and wherein when the extruder passes a rib section between intersections, a feed rate to the extruder is set so that a volume content of the composite fibers in the composite material being formed is less than 50% and so that thermoplastics in the composite material being formed is more than 50%; and when the extruder passes an intersection zone, the feed rate of plastic filament decreases and, thereafter, movement stops or begins in an opposite direction to reduce pressure of plastic in a chamber of the extruder chamber to decrease the volume fraction of thermoplastic in the intersection zone to more than 0% and no more than 20%.

2. The method according to claim 1, wherein the fiber bundle contains reinforcing or functional fibers, or both.

3. The method according to claim 2, wherein the reinforcing fibers comprise carbon or glass or aramid or basalt or boron or metal fibers, or a combination of said fibers.

4. The method according to claim 2, wherein the functional fibers comprise optical or conductive fibers.

5. The method according to claim 1, wherein the thermosetting binder is a thermosetting plastic based on phenol formaldehyde, polyester, epoxy, urea, epoxy phenolic, silicone, polyimide, or bismaleimide binders.

6. The method according to claim 1, wherein the thermoplastic material is fed as a filament or granules or powder.

7. The method according to claim 1, wherein the thermoplastic material comprises acrylonitrile butadiene styrene, polylactide, polyamide, polyetherimide, polyethylene terephthalate, polyacetal, polysulfone, polyetheretherketone, or polyethylene terephthalate glycol.

8. The method according to claim 1, wherein a three coordinate movement mechanism is configured to move the extruder relative to the table surface along the programmed trajectory.

9. The method according to claim 1, wherein a control system is configured to synchronize the movement of the extruder along the programmed trajectory with supply of the composite fiber and thermoplastic material, the control system being further configured to maintain a pre-assigned temperature of the extruder and a temperature of the table surface, and to switch-on the trimming mechanism at pre-assigned times.

10. The method according to claim 1, wherein the composite fiber is additionally coated with a layer of the thermoplastic material.

11. The method according to claim 1, wherein the thermoplastic material is additionally fed into an additional second extruder, heated to a temperature above melting point of the thermoplastic material, and further comprising extruding composite material from the extruder and the thermoplastic material from the additional second extruder onto the table surface, while executing a cut of the composite fiber when a temporary cessation of extrusion is required.

12. The method according to claim 11, wherein the a three coordinate movement mechanism is configured to move extruder and the additional second extruder relative to the table surface along the programmed trajectory.

13. The method according to claim 1, wherein the thermoplastic material is additionally fed into an additional second extruder and heated to a temperature above melting point of the thermoplastic material; and also an additional thermoplastic material, which is soluble in substances in which the thermoplastic material and thermosetting binder of the composite fiber are not dissolved, is fed into an additional third extruder, which is heated to a temperature exceeding melting temperature of the additional thermoplastic material; and then extrusion of the following is performed: the composite material is the extruder, the thermoplastic material from the additional second extruder and the additional thermoplastic material from the additional third extruder, said extrusion is carried out onto the table surface, and while executing a cut of the composite fiber when a temporary cessation of extrusion is required.

14. The method according to claim 13, wherein the a three coordinate movement mechanism is configured to move extruder and the additional second and third extruders relative to the table surface along the programmed trajectory.

15. The method of claim 1, wherein the product is printed, and further comprising controlling a fiber volume fraction of the composite fibers in the product during the printing so that different portions of the product have different fiber volume fractions.

16. The method of claim 15, further comprising adjusting the feed rate into the extruder to control the fiber volume fraction of the composite fibers in the product during the printing and a distance between composite fibers when they are laid out so that the different portions of the product have the different fiber volume fractions.

17. The method of claim 16, wherein the feed rate is adjusted in terms of reinforcing filament and thermoplastic.

18. The method of claim 1, wherein if the rib section has a thickness less than a predetermined threshold, the feed rate is not changed when passing the intersection zone.

* * * * *